US006933052B2

(12) United States Patent
Gorman et al.

(10) Patent No.: US 6,933,052 B2
(45) Date of Patent: Aug. 23, 2005

(54) DIFFUSION BARRIER AND PROTECTIVE COATING FOR TURBINE ENGINE COMPONENT AND METHOD FOR FORMING

(75) Inventors: Mark Daniel Gorman, West Chester, OH (US); Bangalore Aswatha Nagaraj, West Chester, OH (US); Ramgopal Darolia, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/681,433

(22) Filed: Oct. 8, 2003

(65) Prior Publication Data

US 2005/0079368 A1 Apr. 14, 2005

(51) Int. Cl.[7] .............................. B32B 15/04; F03B 3/12
(52) U.S. Cl. ...................... 428/469; 428/698; 428/472; 428/701; 428/702; 416/241 R; 416/241 B
(58) Field of Search .................................. 428/469, 472, 428/632, 615, 697, 698, 699, 701, 702, 679, 680; 416/241 R, 241 B; 427/250, 255.19, 255.21

(56) References Cited

U.S. PATENT DOCUMENTS

| | | | |
|---|---|---|---|
| 3,998,603 A | 12/1976 | Rairden, III | |
| 5,427,866 A | 6/1995 | Nagaraj et al. | |
| 5,484,263 A | 1/1996 | Nagaraj et al. | |
| 5,645,893 A | 7/1997 | Rickerby et al. | |
| 5,759,640 A | 6/1998 | Mannava et al. | |
| 5,824,205 A | 10/1998 | Foster | |
| 5,837,385 A | 11/1998 | Schaeffer et al. | |
| 6,020,075 A | 2/2000 | Gupta et al. | |
| 6,129,988 A | 10/2000 | Vance et al. | |
| 6,306,515 B1 | 10/2001 | Goedjen et al. | |
| 6,306,524 B1 | 10/2001 | Spitsberg et al. | |
| 6,413,584 B1 | 7/2002 | Wustman et al. | |
| 6,455,167 B1 | 9/2002 | Rigney et al. | |
| 6,458,473 B1 | 10/2002 | Conner et al. | |
| 6,521,113 B2 | 2/2003 | Strangman et al. | |
| 6,528,189 B1 | 3/2003 | Beele | |
| 6,582,534 B2 | 6/2003 | Jackson et al. | |
| 6,609,894 B2 | 8/2003 | Jackson et al. | |
| 6,627,323 B2 * | 9/2003 | Nagaraj et al. | 428/469 |
| 6,652,987 B2 * | 11/2003 | Allen et al. | 428/622 |
| 2001/0004475 A1 | 6/2001 | Allen et al. | |
| 2002/0119043 A1 | 8/2002 | Allen et al. | |
| 2002/0130047 A1 | 9/2002 | Allen et al. | |
| 2002/0197502 A1 | 12/2002 | Zhao et al. | |
| 2003/0003328 A1 | 1/2003 | Spitsberg et al. | |
| 2003/0118863 A1 | 6/2003 | Darolia et al. | |
| 2003/0148141 A1 | 8/2003 | Zhao et al. | |
| 2003/0157363 A1 | 8/2003 | Rigney et al. | |
| 2003/0186075 A1 | 10/2003 | Zhao et al. | |

OTHER PUBLICATIONS

Darolia et al., U.S. Appl. No. 10/634,543, filed Aug. 5, 2003.
Darolia et al., U.S. Appl. No. 10/668,087, filed Sep. 22, 2003.
Ackerman et al., U.S. Appl. No. 10/199,185, filed Jul. 19, 2002.

* cited by examiner

*Primary Examiner*—Jennifer McNeil
(74) *Attorney, Agent, or Firm*—Hasse & Nesbitt LLC; Donald E. Hasse

(57) ABSTRACT

A turbine engine component comprising a substrate made of a nickel-base or cobalt-base superalloy, a non-metallic oxide or nitride diffusion barrier layer overlying the substrate, and a protective coating overlying the barrier layer, the protective coating comprising at least one platinum group metal selected from the group consisting of platinum, palladium, rhodium, ruthenium and iridium. The diffusion barrier layer may be a deposited or thermally grown oxide material, especially aluminum oxide. The protective coating may be heat treated to increase homogeneity of the coating and adherence with the substrate. The component typically further comprises a ceramic thermal barrier coating overlying the protective coating. Also disclosed are methods for forming a protective coating system on the turbine engine component by forming the non-metallic oxide or nitride diffusion barrier layer on the substrate and then depositing the platinum group metal on top of the barrier layer.

13 Claims, 1 Drawing Sheet

DIFFUSION BARRIER AND PROTECTIVE COATING FOR TURBINE ENGINE COMPONENT AND METHOD FOR FORMING

BACKGROUND OF THE INVENTION

The present invention relates to a diffusion barrier layer and protective coating for turbine engine components that are exposed to high temperature, oxidation and corrosive environments. More particularly, the invention is directed to forming a non-metallic oxide or nitride diffusion barrier layer between a superalloy substrate and a protective coating for the substrate. The protective coating can be an environmental coating or a bond coat for a thermal barrier coating on the turbine engine component, and is formed by depositing at least one platinum group metal on the diffusion barrier layer.

In aircraft gas turbine engines, the turbine vanes and blades are typically made of nickel-based or cobalt-based superalloys that can operate at temperatures of up to about 1150° C. Various types of coatings are used to protect these superalloys. One type of protective coating is based on a material like MCrAl(X), where M is nickel, cobalt, or iron, or combinations thereof, and X is an element selected from the group consisting of Ta, Re, Ru, Pt, Si, B, C, Hf, Y and Zr, and combinations thereof. The MCrAl(X) coatings can be applied by many techniques, such as high velocity oxy-fuel (HVOF), plasma spray, or electron beam-physical vapor deposition (EB-PVD). Another type of protective coating is an aluminide material, such as nickel-aluminide. A platinum-aluminide coating can be applied, for example, by electroplating platinum onto the substrate, followed by a diffusion step, which is then followed by an aluminiding step, such as pack aluminiding. These types of coatings usually have relatively high aluminum content as compared to the superalloy substrates. The coatings often function as the primary protective layer (e.g., an environmental coating). As an alternative, these coatings can serve as bond layers for subsequently applied overlayers, e.g., thermal barrier coatings (TBCs).

When the protective coatings and substrates are exposed to a hot, oxidative, corrosive environment (as in the case of a gas turbine engine), various metallurgical processes occur. For example, an adherent alumina ($Al_2O_3$) layer ("scale") usually forms on top of the protective coatings. This oxide scale is desirable because of the protection it provides to the underlying coating and substrate.

At elevated temperatures, interdiffusion of elemental components between the coating and the substrate often occurs. The interdiffusion can change the chemical characteristics of each of these regions, while also changing the characteristics of the oxide scale. In general, there is a tendency for the aluminum from the aluminum-rich protective layer to migrate inwardly toward the substrate. At the same time, traditional alloying elements in the substrate (e.g., a superalloy), such as cobalt, tungsten, chromium, rhenium, tantalum, molybdenum, and titanium, tend to migrate from the substrate into the coating. (These effects occur as a result of composition gradients between the substrate and the coating).

Aluminum diffusion into the substrate reduces the concentration of aluminum in the outer regions of the protective coatings. This reduction in concentration will reduce the ability of the outer region to regenerate the protective alumina layer. Moreover, the aluminum diffusion can result in the formation of a diffusion zone in an airfoil wall, which undesirably consumes a portion of the wall. Simultaneously, migration of the traditional alloying elements like molybdenum and tungsten from the substrate into the coating can also prevent the formation of an adequately protective alumina layer.

A diffusion barrier between the coating and the substrate alloy can prolong coating life by eliminating or greatly reducing the interdiffusion of elemental components. However, very thin layers of some materials may be insufficient for reducing the interdiffusion at high operating temperatures. Also, there should not be a substantial mismatch in CTE (coefficient of thermal expansion) between the protective coating, the diffusion barrier layer and a superalloy substrate. Otherwise, the overlying coating may spall during thermal cycling of the turbine engine component.

Thus, new diffusion barrier layers and protective coatings that overcome some of the drawbacks of the art would be welcome for high-temperature superalloy substrates. The barrier layer should have relatively low "interdiffusivity" for substrate elements and the protective coating. The barrier layer should also be chemically compatible and compositionally stable with the substrate alloy and any protective coating, especially during anticipated service lives at temperatures up to about 1150° C. Moreover, the barrier layer should exhibit a relatively high level of adhesion to both the substrate and the protective coating. The barrier layer should also exhibit only a minimum of CTE mismatch with the substrate and protective coating. Furthermore, the barrier layer and the protective coating should be capable of deposition by conventional techniques.

BRIEF DESCRIPTION OF THE INVENTION

In one aspect, the invention relates to a turbine engine component comprising:
  a) a substrate made of a nickel-base or cobalt-base superalloy;
  b) a non-metallic oxide or nitride diffusion barrier layer overlying the substrate; and
  c) a protective coating overlying the barrier layer, the protective coating comprising at least one platinum group metal selected from the group consisting of platinum, palladium, rhodium, ruthenium and iridium.

In another aspect, this invention relates to a turbine engine component comprising:
  a) a substrate made of a nickel-base or cobalt-base superalloy;
  b) a non-metallic oxide or nitride diffusion barrier layer overlying the substrate;
  c) a protective coating overlying the barrier layer, the protective coating comprising at least one platinum group metal selected from the group consisting of platinum, palladium, rhodium, ruthenium and iridium; and
  d) a ceramic thermal barrier coating overlying the protective coating.

Another aspect of the invention relates to a method for forming a protective coating system on a turbine engine component, the method comprising:
  a) providing a substrate made of a nickel-base or cobalt-base superalloy;
  b) forming a non-metallic oxide or nitride diffusion barrier layer on the substrate; and
  c) depositing a protective coating comprising at least one platinum group metal selected from the group consisting of platinum, palladium, rhodium, ruthenium and iridium on the barrier layer.

The invention also relates to a method for forming a protective coating system on a turbine engine component, the method comprising:

a) providing a substrate made of a nickel-base or cobalt-base superalloy;

b) forming a non-metallic oxide or nitride diffusion barrier layer on the substrate;

c) depositing a protective coating comprising at least one platinum group metal selected from the group consisting of platinum, palladium, rhodium, ruthenium and iridium on the barrier layer; and d) forming a ceramic thermal barrier coating over the protective coating.

DETAILED DESCRIPTION OF THE INVENTION

Figure 1:
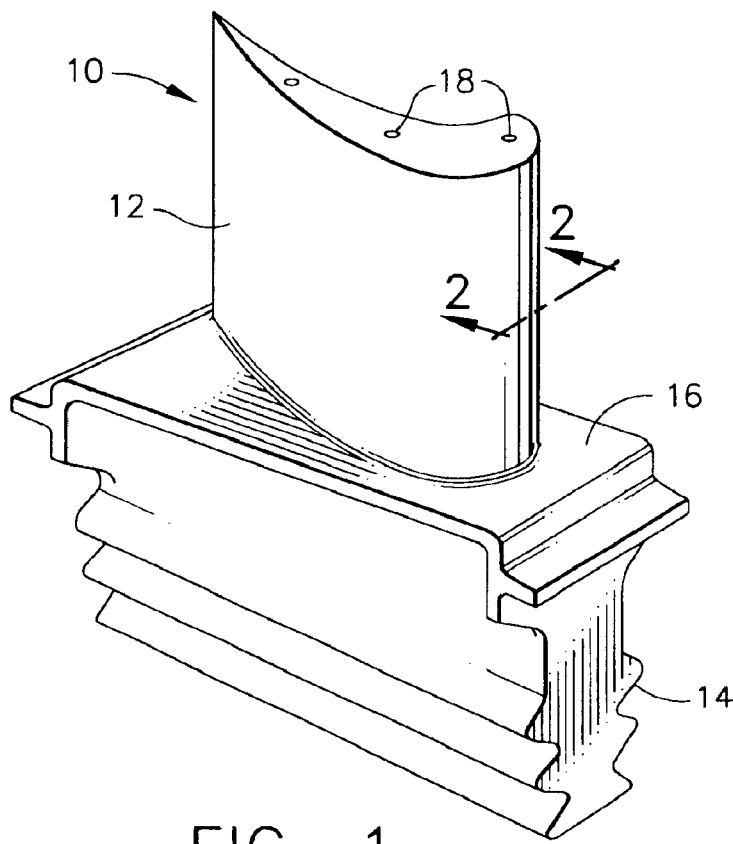
FIG. 1 is a perspective view of a gas turbine engine component.

This invention is directed to a diffusion barrier layer and protective coating for a turbine engine component, such as a turbine blade or vane, having a substrate made of a nickel-base or cobalt-base superalloy. The term "superalloy" is intended to embrace complex cobalt- or nickel-based alloys that include one or more other elements, such as chromium, rhenium, aluminum, tungsten, molybdenum, tantalum and titanium. Superalloys are described in various references, e.g., U.S. Pat. Nos. 5,399,313 and 4,116,723. High temperature alloys are also generally described in Kirk-Othmer's Encyclopedia of Chemical Technology, 3rd Edition, Vol. 12, pp. 417–479 (1980), and Vol. 15, pp. 787–800 (1981). The actual configuration of the substrate may vary widely. For example, the substrate may be in the form of various turbine engine parts, such as combustor liners, combustor domes, shrouds, blades, nozzles, or vanes.

As used herein, "diffusion barrier layer" is meant to describe a layer of material that prevents the substantial migration of alloy elements of the substrate into the protective coating. Non-limiting examples of alloy elements of the substrate are nickel, cobalt, iron, aluminum, chromium, refractory metals (e.g., tungsten, tantalum, rhenium, and molybdenum), hafnium, carbon, boron, yttrium, titanium, and combinations thereof. These elements, when diffused into the protective coating, can be detrimental to the environmental resistance and/or thermal barrier coating adhesion properties of the turbine engine component. The diffusion barrier layer is relatively thermodynamically and kinetically stable at the service temperatures encountered by the turbine engine component.

Overlying the superalloy substrate is the non-metallic oxide or nitride diffusion barrier layer. The barrier layer is formed between, and typically is in direct contact with, the superalloy substrate and the overlying protective coating. The barrier layer is tightly adherent and substantially impermeable to diffusion of atoms from the substrate and from the overlying protective coating. It is thermally stable and has a low self-diffusion coefficient. The diffusion barrier layer essentially creates a stable zone between the underlying substrate and the protective coating that prevents interactions, which are usually undesirable, between the substrate and the coating.

The diffusion barrier layer herein can be an oxide of a variety of elements, for example, aluminum, zirconium, hafnium, yttrium, silicon, and chromium, and mixtures thereof. Of these, oxides of aluminum and zirconium, or mixtures thereof, are typically used. Such oxides can be deposited on the superalloy substrate by various processes known in the art, such as thermal spray, sol gel, laser deposition, physical vapor deposition, chemical vapor deposition, or ion plasma (also known as cathodic arc) deposition, or they can be formed on the substrate as a thermally grown oxide.

In one embodiment, the oxide layer is alumina. A thin alumina layer can significantly reduce the migration of elements from the protective coating inwardly and the migration of elements outwardly from the substrate into the protective coating, thereby stabilizing the compositions of both the coating and substrate. Alumina forms a strong bond with nickel-base superalloy substrates used in airfoils. It also forms a strong bond with the protective coatings herein.

In one embodiment, a thin, tightly adherent alumina layer is formed on the surface of a Ni-base superalloy substrate by subjecting the substrate to a controlled oxidizing heat treatment at a temperature above about 980° C. Aluminum, inherent in commonly used nickel-base superalloy substrates for airfoil applications, such as, for example, René N5 having a nominal composition of 6.2% Al, oxidizes at the surface of the substrate forming a tightly adherent alumina film. While the film thickness will depend on the temperature and the length of time at the temperature, the thickness typically is from about 0.5 to about 5 microns, more typically about 1 micron.

In another embodiment, a thermally grown oxide layer is promoted by depositing a thin layer (e.g., about 1–25 microns thick, depending on the choice of material and deposition process) of aluminum, an aluminide (e.g., Ni or Co), a chromium-rich material like Ni—Cr—Al, or a platinum group metal such as platinum, on the substrate. A variety of deposition processes may be used, but physical vapor deposition, chemical vapor deposition, thermal spray, plating or diffusion coating processes are typically used. The aluminum, chromium or platinum group metal promotes the formation of the thermally grown oxide during a pre-oxidation step. The oxide-promoting layer formed is typically thin enough to diffuse to a low concentration and not be considered an additional layer at the completion of the coating process.

If additional strength is required between the diffusion barrier layer and the substrate, a mechanical bond can be generated between the barrier layer and substrate by including fine oxides of reactive elements, including at least one element selected from the group consisting of Zr, Y, Ca, Ce and Hf, as disclosed in U.S. Pat. No. 6,455,167. These reactive elements may already be present in the substrate in sufficient amounts to cause the formation of internal oxides during a subsequent heat treatment after application of the diffusion barrier layer.

In another embodiment, the diffusion barrier layer in the form of an alumina scale is applied directly to the substrate or to a pre-bond coat applied to the substrate. If the above mechanical interlocks are not employed, or if the substrate includes sufficient reactive metals to form the requisite amounts of fine oxides across the substrate/diffusion barrier interface during a subsequent heat treatment, a pre-bond coat is typically not applied. If the substrate does not include sufficient amounts of reactive elements or if mechanical interlocks are desired across both interfaces of the diffusion barrier, then a pre-bond layer including the above reactive elements may be deposited over the substrate. In this embodiment, a thin layer of alumina having a thickness of less than about 10 microns, and typically about 1 micron or less, is directly deposited over either the substrate surface or the pre-bond coat applied to the substrate surface. Unlike the prior embodiment in which the alumina was thermally grown over the underlying material, in this embodiment a thin layer of oxide, alumina for example, is directly applied to the underlying material by sputtering, organo-metallic chemical vapor deposition or by electron beam physical vapor deposition. The applied oxide layer may also include reactive elements that can assist in the formation of oxides during subsequent heat treatment. The protective coating can then be applied over the diffusion barrier and fine oxides forming the mechanical interlocks, when required, can be grown in a thermal treatment as set forth above.

In other embodiments, the diffusion barrier layer comprises a non-metallic nitride material, such as chromium nitride, aluminum nitride and titanium nitride as disclosed in U.S. Pat. Nos. 5,484,263, 6,528,189 and 6,129,998. The diffusion barrier layer herein may also comprise mixtures of oxides and nitrides (e.g., oxy-nitrides).

Methods for applying the diffusion barrier layer over the substrate are known in the art. They include, for example, electron beam physical vapor deposition (EB-PVD), electroplating, ion plasma deposition (IPD), chemical vapor deposition (CVD), plasma spray (e.g., air plasma spray (APS)), high velocity oxy-fuel (HVOF), low-pressure plasma spray (LPPS), sputtering, and the like. Single-stage processes can be used to deposit the entire coating chemistry. Those skilled in the art can adapt the present invention to various types of equipment. For example, the alloy coating elements can be incorporated into the source material in the case of physical vapor deposition. Thermal spray processes (e.g., APS, LPPS, and HVOF) benefit from surface roughening (e.g., grit blasting, etching, shot peening, surface grooving, or combinations thereof) prior to deposition in order to improve adhesion of the diffusion barrier layer.

The thickness of the barrier layer will depend on a variety of factors, including the particular composition of the substrate and the layer (or layers) applied over the barrier layer; the intended end use for the turbine engine component; the expected temperature and temperature patterns to which the component will be subjected; and the intended service life and repair intervals for the coating system. When used on a turbine engine blade or airfoil, the barrier layer usually has a thickness in the range of about 0.05 to about 10 microns, typically from about 0.5 to about 5 microns, and more typically from about 1 to about 3 microns. These ranges may be varied considerably to suit the needs of a particular end use.

Sometimes, a heat treatment is performed after the diffusion barrier layer is applied over the substrate. The purpose of the heat treatment is to improve adhesion and to enhance the chemical equilibration between the barrier layer and the substrate. The treatment is often carried out at a temperature in the range of about 950° C. to about 1200° C., for up to about 16 hours.

A protective coating comprising at least one platinum group metal selected from the group consisting of platinum, palladium, rhodium, ruthenium and iridium, and optionally comprising chromium, nickel, hafnium, zirconium, aluminum, yttrium, or cerium, or mixtures thereof, is then formed overlying the diffusion barrier layer. The resulting protective coating system comprises the diffusion barrier layer and the protective coating. The protective coating can be used as an environmental coating or a bond coat for a ceramic thermal barrier coating deposited on the overlay coating. The thermal barrier coating system formed provides improved resistance to oxidation, spallation, and hot corrosion as compared to conventional bond coats such as aluminide diffusion coatings and MCrAlY coatings. Additionally, conventional bond coats and environmental coatings often have high levels of aluminum that can diffuse into the base metal and create a secondary reaction zone that reduces the mechanical strength of the component. This is avoided in the present invention by forming a protective coating comprising relatively inert platinum group metals. The protective coatings have low oxidation rates, and are sometimes referred to as inert coatings. The resulting coatings also have high strength and durability, and a minimum of thermal expansion mismatch with ceramic thermal barrier coatings used on turbine engine components. The protective coatings herein typically replace conventional environmental coatings and bond coats used on turbine engine components. The invention thus provides an improved turbine engine component that is protected against high temperatures and adverse environmental effects by the diffusion barrier layer and protective coating herein, and optionally further protected by an additional ceramic thermal barrier coating.

The present invention is generally applicable to turbine engine components that operate within environments characterized by relatively high temperatures, severe thermal stresses and thermal cycling. Such components include the high and low-pressure turbine nozzles and blades, shrouds, combustor liners and augmentor hardware of gas turbine engines. One such example is the high-pressure turbine blade 10 shown in FIG. 1. The blade 10 generally includes an airfoil 12 against which hot combustion gases are directed during operation of the gas turbine engine, and whose surface is therefore subjected to severe attack by oxidation, corrosion and erosion. The airfoil 12 is anchored to a turbine disk (not shown) with a dovetail 14 formed on a root section 16 of the blade 10. Cooling holes 18 are present in the airfoil 12 through which bleed air is forced to transfer heat from the blade 10. While the advantages of this invention will be described with reference to the high pressure turbine blade 10 shown in FIG. 1, and particularly nickel-base superalloy blades of the type shown in FIG. 1, the teachings of this invention are generally applicable to any turbine engine component susceptible to degradation from diffusion of substrate elements into an overlay coating used to protect the component from its environment.

Figure 2:
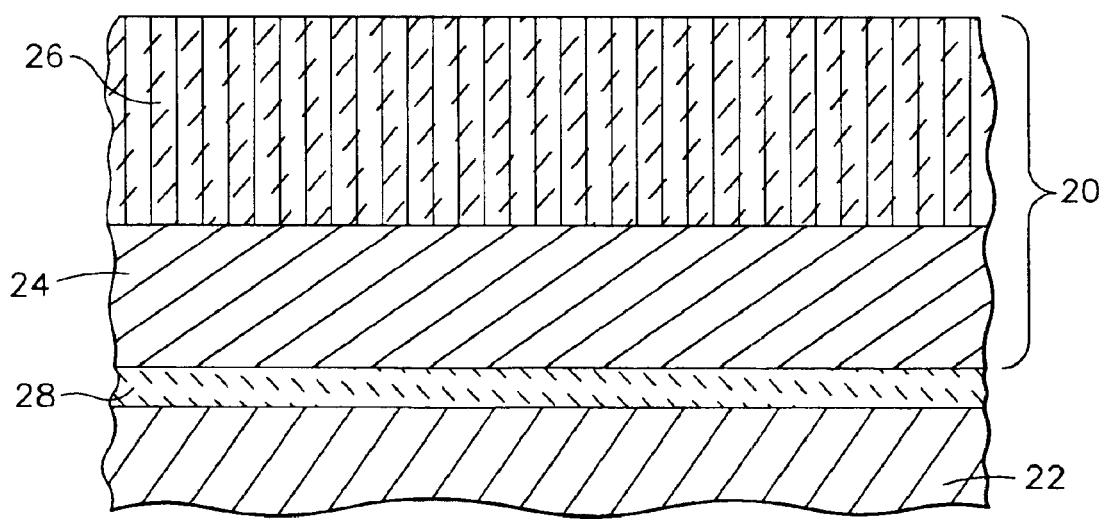
FIG. 2 is a sectional view through the component of FIG. 1 along line 2—2, showing one embodiment of the invention.

FIG. 2 shows a thermal barrier coating system 20 of a type that benefits from the teachings of this invention. Coating system 20 includes a ceramic layer 26 and a protective coating 24, which serves as a bond coat to the ceramic layer 26. A diffusion barrier layer 28 overlays blade substrate 22. Substrate 22 is typically a high-temperature material, such as an iron, nickel or cobalt-base superalloy.

The diffusion barrier layer 28 is employed to minimize diffusion between the protective coating 24 and the substrate 22. In one embodiment, the diffusion barrier is a thin layer (e.g., from about 0.05 to about 10 microns thick) of aluminum oxide, which may be deposited on the substrate by processes such as thermal spray, sol gel, laser deposition, physical vapor deposition, or chemical vapor deposition, or formed as a thermally grown oxide, as described above. For example, an aluminum oxide layer about 1 micron thick may be formed by oxidizing the surface of an aluminum rich superalloy or a superalloy that has had its surface enriched in aluminum to promote the formation of aluminum oxide. The oxidation step may be performed by heating the substrate to a temperature in the range of from about 900° C. to about 1150° C. for about two hours in air or in a controlled atmosphere, especially with a partial pressure of oxygen.

Protective coating 24 comprises at least one platinum group metal selected from the group consisting of platinum, palladium, rhodium, ruthenium, and iridium. The platinum group metal or metals can be deposited on the substrate 22 by a variety of processes, including electroplating, EB-PVD, sputtering, ion plasma and thermal spray processes. In one embodiment, the coating 24 comprises at least two, and often at least three, of the above platinum group metals. In most applications, coating 24 comprises at least about 40%, and typically at least about 50%, by weight, of platinum or rhodium, or mixtures thereof. The particular platinum group metals used, their relative proportions, and the thickness of the coating can be selected to obtain the desired properties, such as strength, oxidation resistance, durability, hardness, thermal expansion, and elastic modulus for the coating application at hand. Minor amounts of additional elements, such as aluminum, zirconium, hafnium and chromium, and mixtures thereof, can be added to improve the mechanical and/or physical properties of the coating 24. Such elements can be added at levels up to about 25%, typically up to about 20%, by weight of the coating. Coating 24 typically has a thickness of from about 5 to about 120 microns, more typically from about 10 to about 60 microns. When the above metals are deposited sequentially as individual layers on the substrate, the thickness of each layer of metal in the protective coating 24 is usually from about 2 to about 50 microns, more typically from about 5 to about 25 microns.

Prior to depositing the diffusion barrier layer 28 and/or the protective coating 24, the surface of the turbine engine component may be cleaned or conditioned, for example, by using a caustic solution or grit blasting operation, immersing the component in a heated liquid solution comprising a weak acid, and/or agitating the surface of the component while it remains immersed in the solution. In this manner, any dirt or corrosion products on the surface can be removed without damaging the component.

The protective coating 24, and each of its layers, may be deposited by a variety of methods as mentioned above. One suitable approach is electroplating, including the various electroplating and entrapment plating processes known in the art. Electroplating processes have relatively high deposition efficiencies that make them particularly useful for depositing the expensive platinum group metals herein. The platinum group metals may be deposited sequentially; two or more metals may be co-plated; the metals may be deposited using entrapment plating; or any combination of these processes may be used. Electroplating of individual layers is typically used, however, to more easily the control bath chemistry and process parameters. For example, a platinum layer may be deposited by placing a platinum-comprising solution into a deposition tank and depositing platinum from the solution onto the component in an electroplating process. An operable platinum-comprising aqueous solution is $Pt(NH_3)_4HPO_4$ having a concentration of about 4–20 grams per liter of platinum. The voltage/current source can be operated at about 0.5–20 amperes per square foot (about 0.05–0.93 amperes per square meter) of facing article surface. The platinum layer can be deposited in from about 1 hour to about 4 hours at a temperature of about 190–200° F. (about 88–93° C.). Other platinum source chemicals and plating parameters known in the art may also be used. Similar processes can be used to deposit palladium, rhodium, ruthenium and iridium, and combinations thereof. A thin flash coating of a conductive material may be deposited to promote electroplating over the non-electrically conductive, non-metallic diffusion barrier layer. Examples include electroless nickel plate and sputtered platinum.

In one embodiment, an entrapment plating process is used to deposit the platinum group metals herein. In this process, standard electroplating is conducted with a fine dispersion of solid particulate material suspended in the plating solution. Some of the particles become entrapped and retained in the plated coating. A diffusion treatment can then be used to obtain a substantially uniform composition of the coating. The ratio of plated to entrapped material and the composition of each material is controlled to arrive at the desired overall coating composition. For example, platinum plating can be used to trap rhodium-palladium particulates and obtain a Pt—Rh—Pd coating. An entrapment plating process is particularly useful for adding minor amounts (e.g., up to about 25%, typically up to about 20%, by weight) of non-platinum group metals such as aluminum, zirconium, hafnium and chromium, and mixtures thereof.

After depositing the protective coating 24, or each layer thereof, the article is often heat treated, typically at about 900° C. to about 1200° C., more typically from about 1000° C. to about 1100° C., for a period of time, e.g., up to about 24 hours, but generally from about 1 to about 8 hours, typically from about 2 to about 4 hours. This causes the metals of the protective coating to interdiffuse, increasing the homogeneity of the coating. Heat treating also improves the adherence or bond between the coating and the diffusion barrier layer, and the barrier layer and the substrate. The heat treatment may be conducted after deposition of single or multiple layers of the platinum group metals, or after electroplating is complete, to enhance microstructure and composition uniformity, improve adherence of the protective coating 24, and reduce residual stresses within the coating and the adjoining surfaces.

A ceramic layer 26 may then be deposited on the protective coating 24. Ceramic layer 26 is formed of a ceramic material that serves to insulate the substrate 22 from the temperature of the hot exhaust gas passing over the surface of the airfoil 12 when the engine is in service. The ceramic layer 26 may be any acceptable material, but typically is yttria-stabilized zirconia (YSZ) having a composition of from about 3 to about 20 weight percent yttrium oxide (e.g., about 7 percent yttrium oxide), with the balance zirconium oxide. Other thermal barrier materials can also be used, such as zirconia stabilized by ceria ($CeO_2$), scandia ($Sc_2O_3$), or other oxides. The ceramic layer 26 usually has a thickness of from about 50 to about 1000 microns, typically about 75 to about 400 microns. The ceramic layer 26 is typically applied by air plasma spray, low-pressure plasma spray or physical vapor deposition techniques. To attain a strain-tolerant columnar grain structure, the ceramic layer 26 is usually deposited by physical vapor deposition (PVD), though other deposition techniques can be used. In contrast with conventional environmental coatings and bond coats, the surface of the protective coating 24 typically does not oxidize to any significant degree to form an oxide surface layer. However, since ceramic thermal barrier coatings are sufficiently permeable to gas that oxygen from the operating environment may diffuse through such a coating and react with non-platinum group metals in the bond coat, a small amount of oxide may be formed. Any such oxide layer formed adheres well to the protective coating and chemically bonds with the ceramic layer 26 so that satisfactory performance of a thermal barrier coating system is provided.

The following example is intended to illustrate aspects of the invention, and should not be taken as limiting the invention in any respect.

EXAMPLE

A protective coating system of the invention comprising a diffusion barrier layer and a protective coating is formed on button specimens of a nickel-base superalloy known as René N5 having a nominal composition, in weight percent, of 7.5% Co, 7.0% Cr, 6.2% Al, 6.5% Ta, 5.0% W, 3.0% Re, 1.5% Mo, 0.15% Hf, 0.05% C, 0.004% B, 0.01% Y, with the balance nickel and incidental impurities. First, an aluminum oxide diffusion barrier layer about 1 micron thick is formed on the substrate by oxidizing the surface of the aluminum rich superalloy. The oxidation step is performed by heating the substrate to a temperature in the range of from about 900° C. to about 1150° C. for about two hours in air or in a controlled atmosphere, especially with a partial pressure of oxygen.

A thin flash layer (about 2 microns thick) of platinum is applied over the diffusion barrier layer by sputtering. Layers of platinum (about 76.2 microns thick), rhodium (about 12.7 microns thick), and palladium (about 12.7 microns thick) are then sequentially deposited over the diffusion barrier layer by electroplating the button specimens. The samples are then heat treated at a temperature of about 1050° C. for 2 hours. All samples are then coated with a ceramic layer (about 125 microns thick) of zirconia with about 7% yttria by electron beam physical vapor deposition. The thermal barrier coating system formed comprises the ceramic layer and the protective coating comprising platinum, rhodium and palladium.

Various embodiments of this invention have been described. However, this disclosure should not be deemed to be a limitation on the scope of the invention. Accordingly, various modifications, adaptations, and alternatives may occur to one skilled in the art without departing from the spirit and scope of the claimed invention.

What is claimed is:

1. A turbine engine component comprising:
   a) a substrate made of a nickel-base or cobalt-base superalloy;
   b) a non-metallic oxide or nitride diffusion barrier layer overlying the substrate and formed on or deposited on the substrate; and
   c) a protective coating overlying the barrier layer, the protective coating comprising at least two platinum group metals selected from the group consisting of platinum, palladium, rhodium, ruthenium and iridium and comprising at least about 40% by weight of platinum or rhodium, said protective coating having a thickness of from about 10 to about 120 microns.

2. The component of claim 1 wherein the diffusion barrier layer is an oxide material.

3. The component of claim 2 wherein the diffusion barrier layer is aluminum oxide or zirconium oxide, or mixtures thereof.

4. The component of claim 3 wherein the diffusion barrier layer has a thickness of from about 0.05 to about 10 microns.

5. The component of claim 1 wherein the diffusion barrier layer is a thermally grown oxide material.

6. The component of claim 1 wherein the protective coating comprises at least three metals selected from the group consisting of platinum, palladium, rhodium, ruthenium, and iridium.

7. The component of claim 6 wherein the protective coating comprises at least about 50% by weight of platinum or rhodium, or mixtures thereof, and has a thickness of from about 10 to about 60 microns.

8. A turbine engine component comprising:
   a) a substrate made of a nickel-base or cobalt-base superalloy;
   b) a non-metallic oxide or nitride diffusion barrier layer overlying the substrate and formed on or deposited on the substrate; and
   c) a protective coating overlying the barrier layer, the protective coating comprising at least about 40% by weight of a platinum group metal selected from the group consisting of platinum, palladium, rhodium, ruthenium and iridium, and mixtures thereof; and
   d) a ceramic thermal barrier coating overlying the protective coating.

9. The component of claim 8 wherein the diffusion barrier layer is aluminum oxide or zirconium oxide, or mixtures thereof.

10. The component of claim 9 wherein the diffusion barrier layer has a thickness of from about 0.05 to about 10 microns.

11. The component of claim 10 wherein the diffusion barrier layer has a thickness of from about 0.5 to about 5 microns.

12. The component of claim 10 wherein the protective coating comprises at least about 50% by weight of platinum or rhodium, or mixtures thereof.

13. The component of claim 12 wherein the protective coating comprises at least two metals selected from the group consisting of platinum, palladium, rhodium, ruthenium and iridium.

* * * * *